US010421342B2

(12) United States Patent
Hölzel

(10) Patent No.: US 10,421,342 B2
(45) Date of Patent: Sep. 24, 2019

(54) ARRANGEMENT FOR A MOVABLE ROOF ELEMENT FOR A MOTOR VEHICLE AND SYSTEM FOR A MOTOR VEHICLE

(71) Applicant: WEBASTO SE, Stockdorf (DE)

(72) Inventor: Dominik Hölzel, Olching (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/758,278

(22) PCT Filed: Aug. 5, 2016

(86) PCT No.: PCT/EP2016/068789
§ 371 (c)(1),
(2) Date: Mar. 7, 2018

(87) PCT Pub. No.: WO2017/041970
PCT Pub. Date: Mar. 16, 2017

(65) Prior Publication Data
US 2018/0257464 A1   Sep. 13, 2018

(30) Foreign Application Priority Data

Sep. 10, 2015 (DE) .................. 10 2015 115 285

(51) Int. Cl.
*B60J 7/057* (2006.01)
*B60J 7/02* (2006.01)
*B23K 26/352* (2014.01)

(52) U.S. Cl.
CPC .......... *B60J 7/057* (2013.01); *B23K 26/3584* (2018.08); *B60J 7/022* (2013.01); *B60J 7/0573* (2013.01)

(58) Field of Classification Search
CPC ... B60J 7/022; B60J 7/043; B60J 7/057; B60J 7/0573

(Continued)

(56) References Cited

U.S. PATENT DOCUMENTS 6,024,404 A * 2/2000 Stallfort .................. B60J 7/057
296/216.04
6,186,588 B1 * 2/2001 Tsuruo ..................... B60J 7/057
296/216.08

(Continued)

FOREIGN PATENT DOCUMENTS

DE      20111621 U1    9/2001
DE      10205118 A1    8/2003

(Continued)

OTHER PUBLICATIONS

International Search Report for PCT/EP2016/068789 dated Dec. 8, 2016 and English translation submitted herewith (7 Pages).

(Continued)

*Primary Examiner* — Dennis H Pedder
(74) *Attorney, Agent, or Firm* — Fitch, Even, Tabin & Flannery, LLP

(57) ABSTRACT

An arrangement for a movable roof element (101) for a motor vehicle (100) has:
  a carriage (103) which is designed to be guided in a rail (104) and to be moved relative to the rail (104) and which has a first component (105) and a second component (106), and
  a drive cable (107), wherein the second component (106) at least partially surrounds the first component (105) and the drive cable (107) in order to form a coupling (108) between the drive cable (107) and the carriage (103), wherein the coupling (108) has:
  a roughening (109) of the first component (105) in order to form a non-positive and/or integrally bonded connection between the first (105) and the second (106) component.

8 Claims, 4 Drawing Sheets

(58) Field of Classification Search
USPC .......................................... 296/223, 216.08
See application file for complete search history.

(56) References Cited

U.S. PATENT DOCUMENTS

| | | |
|---|---|---|
| 6,257,658 B1 | 7/2001 | Nabuurs et al. |
| 8,764,444 B2 * | 7/2014 | Hansson .............. A61C 8/0018 433/173 |
| 2008/0073944 A1 | 3/2008 | Peter et al. |
| 2009/0072588 A1 * | 3/2009 | Nakamura ............... B60J 7/024 296/216.04 |
| 2013/0234475 A1 | 9/2013 | Katsura |

FOREIGN PATENT DOCUMENTS

| | | |
|---|---|---|
| DE | 10336618 A1 | 5/2005 |
| DE | 102007001286 A1 | 7/2008 |
| DE | 102007023418 A1 | 11/2008 |
| EP | 0899140 A1 | 3/1999 |
| EP | 0901919 A1 | 3/1999 |
| EP | 1905631 A1 | 4/2008 |
| EP | 2636553 A1 | 9/2013 |
| JP | H07-285342 A | 10/1995 |
| WO | 2007079741 A1 | 7/2007 |

OTHER PUBLICATIONS

Written Opinion of the International Searching Authority (6 Pages).

\* cited by examiner

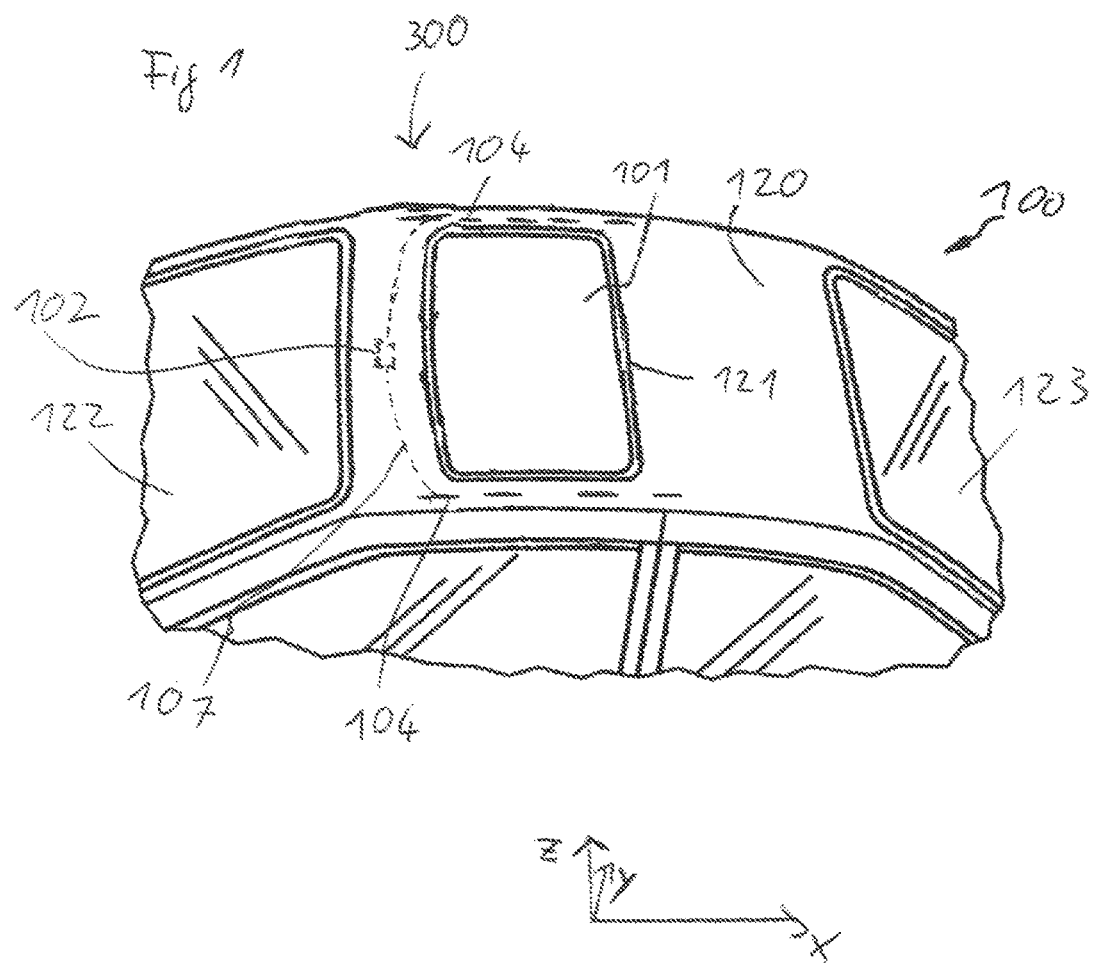

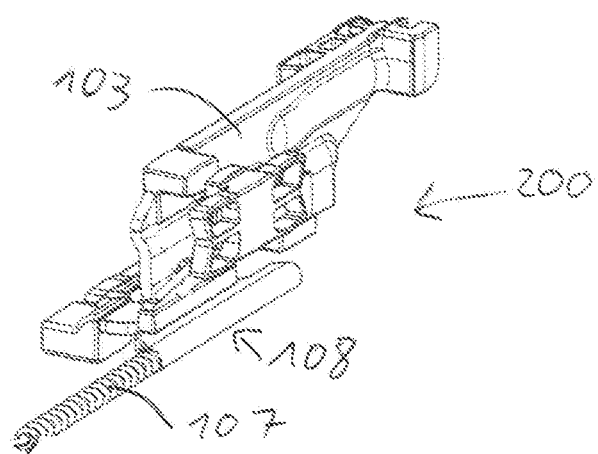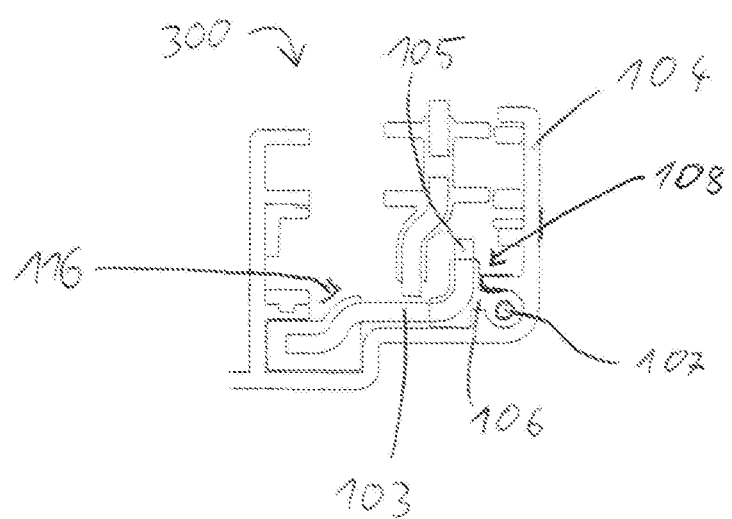

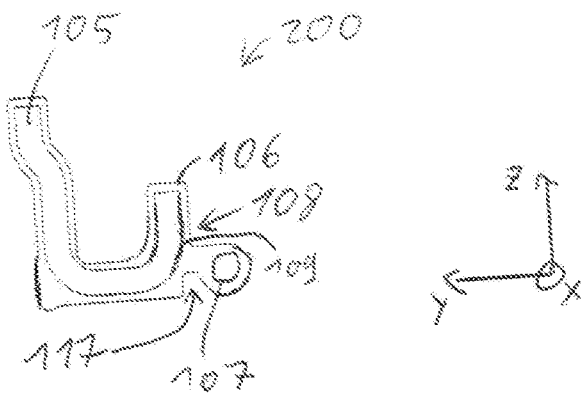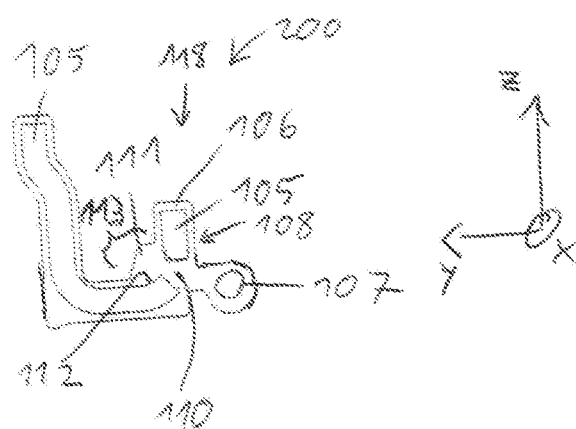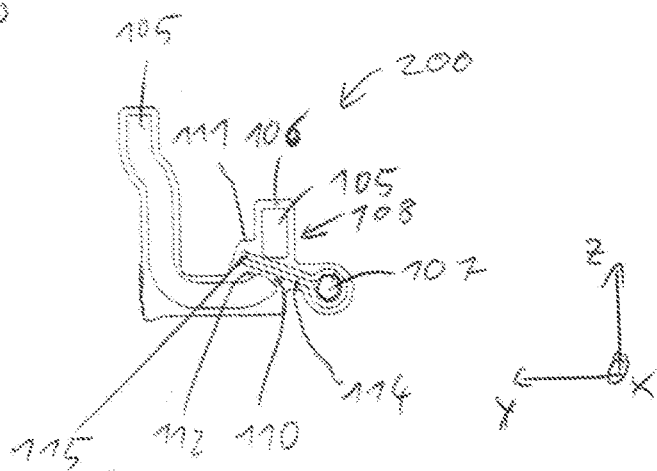

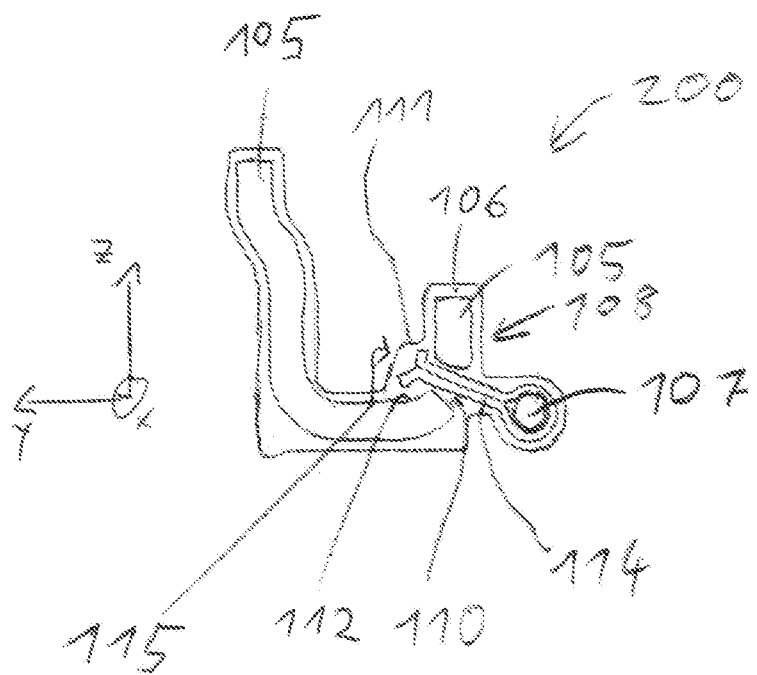

ARRANGEMENT FOR A MOVABLE ROOF ELEMENT FOR A MOTOR VEHICLE AND SYSTEM FOR A MOTOR VEHICLE

CROSS-REFERENCE TO RELATED APPLICATIONS

This application is a U.S. national phase application filed under 35 U.S.C. § 371 of International Application No. PCT/EP2016/068789, filed Aug. 5, 2016, designating the United States, which claims priority from German Patent Application 10 2015 115 285.1, filed Sep. 10, 2015, which are hereby incorporated herein by reference in their entirety for all purposes.

FIELD

The invention relates to an arrangement for a movable roof element for a motor vehicle, in particular for a cover which is able to close a roof opening. The invention further relates to a system for a movable roof element for a motor vehicle which comprises such an arrangement.

BACKGROUND

Roofs for motor vehicles may be provided with a sliding roof. A roof element, also called a cover, in this case is either able to close a roof opening in a closed position of the cover or at least partially open said roof opening in further positions. For controlling the movement of the roof element, a raising mechanism is provided. The raising mechanism is coupled firstly to the roof element and secondly to a carriage. The carriage is guided in a rail which is arranged in the vehicle roof.

In the event of an accident, in particular in the event of a front impact, i.e. a collision with an obstruction in the direction of travel, it is possible that the roof element is accelerated to such an extent that the coupling between the roof element and the guide rail is too weak in order to retain the roof element. The roof element may be released, therefore, from the vehicle roof. To prevent such an acceleration of the roof element, safety brake devices are disclosed, for example, in EP 1 905 631 A1. These safety brake devices are attached to the carriage and jam the carriage to the rail in the event of an abrupt acceleration of the roof element.

It is desirable to specify an arrangement for a movable roof element as well as a system for a movable roof element which permits a reliable coupling of the roof element to a rail, in particular even in the event of an accident. For example, it is desirable to permit a reliable coupling as an alternative or in addition to a safety brake device.

SUMMARY

According to one aspect of the invention, an arrangement for a movable roof element for a motor vehicle has a carriage. The carriage is designed to be guided in a rail and to be moved relative to the rail. The carriage has a first component and a second component. The arrangement has a drive cable. The second component at least partially surrounds the first component and the drive cable in order to form a coupling between the drive cable and the carriage. According to one aspect of the invention, the coupling has a roughening of the first component in order to form a non-positive and/or integrally bonded connection between the first and the second component. In particular, the roughening is produced by a laser, for example by the action of a laser beam on the first component.

The first component comprises the roughening which is provided, in particular, in a region of the drive cable. A surface of the first component is roughened. Thus the first component and the second component are connected together by a non-positive and/or integrally bonded connection, for example in the manner of an adhesive bond. Thus the risk of a detachment of the second component from the first component is reduced. Thus greater forces may be transmitted from the first component to the second component and thus to the drive cable than might be the case without the roughening. In the event of an accident, therefore, it is possible to slow down the acceleration of the roof element sufficiently by means of the coupling of the roof element to the carriage and the coupling of the carriage to the drive cable, in order to prevent a decoupling of the roof element from the vehicle. The drive cable is used as a brake for the roof element. By the roughening of the second component, the coupling between the carriage and the drive cable is sufficiently stable in order to absorb the forces which are present here.

According to a second aspect of the invention, an arrangement for a movable roof element for a motor vehicle has a carriage which is designed to be guided in a rail and to be moved relative to the rail. The carriage has a first component and a second component. The arrangement has a drive cable. The second component at least partially surrounds the first component and the drive cable in order to form a coupling between the drive cable and the carriage. The coupling according to the second aspect has a recess of the first component. A material of the second component is arranged in the recess. The coupling has a retaining head which is configured by means of the second component on a side remote from the drive cable in a region of the recess.

By means of the recess in the second component it is possible to arrange the material of the second component on the first component such that the retaining head is formed on the side remote from the drive cable. Starting with the retaining head, the second component extends through the recess to the drive cable and surrounds the drive cable. The retaining head is configured to be wider than the recess and thus retains the drive cable on the first component in the manner of a welding dome and/or a plastics rivet. Thus the drive cable is fastened sufficiently firmly to the carriage by means of the coupling in order to absorb the forces present in the event of an accident. The coupling between the drive cable and the carriage is sufficiently stable for the drive cable to slow down the acceleration of the roof element in the event of an accident. A detachment of the drive cable from the carriage is preventable by the retaining head, which is formed from the second component, and the arrangement of the second component in the recess. The coupling is sufficiently strong to transmit the forces reliably from the roof element to the drive cable. The drive cable is used as a brake for the roof element.

By means of the coupling according to the first aspect and the coupling according to the second aspect, in each case the drive cable and the carriage are connected sufficiently firmly together in order to prevent a detachment of the carriage from the drive cable in the event of an accident. The coupling according to the first aspect and the coupling according to the second aspect in each case are sufficiently stable in order to withstand and to transmit the forces which act on the coupling in the event of an accident. By means of the coupling according to the first aspect and the coupling according to the second aspect, in each case reliable connections are made between the drive cable and the carriage, which as an alternative or in addition to a safety brake device prevent an uncontrolled acceleration of the roof element.

Further embodiments comprise a combination of the first aspect and the second aspect. The coupling comprises, therefore, the recess of the first component and the retaining head. Moreover, the coupling comprises the roughening of the first component in order to form a non-positive and/or integrally bonded connection between the first and the second component. Thus it is possible to transmit greater forces between the drive cable and the carriage than respectively in the first aspect and the second aspect alone.

According to further embodiments, the coupling comprises a retaining element. The retaining element is connected to the drive cable. The retaining element, starting from the drive cable, extends through the recess. In particular, the retaining element forms a positive connection with the second component. The retaining element is, in particular, extended longitudinally along the drive cable. Thus, by means of the retaining element it is possible to reduce or to prevent the carriage and/or the second component from rotating and/or deflecting. As a result, it is possible to prevent a detachment of the second component from the first component, which has been caused by the rotation. As a result, the coupling between the carriage and the drive cable is able to transmit high forces.

According to further embodiments, the retaining element comprises a projecting region which projects over the first component on the side remote from the drive cable. Thus it is possible for the retaining element to be hooked behind the first component. As a result, it is prevented that the retaining element is inadvertently removed from the recess.

According to further embodiments, the retaining element is formed from a metal, in particular a sheet metal part. The retaining element is attached, in particular, to the drive cable by means of a plastic deformation of the retaining element. For example, the retaining element is crimped onto the drive cable.

According to further embodiments, the first component is formed from a metal, for example steel. The second component is formed from a plastics material. For example, the coupling is formed by encapsulating the drive cable and the first component by injection-molding with the plastics material. Thus an integrally bonded connection is made between the carriage and the drive cable. A plug connection between the carriage and the drive cable may be dispensed with.

According to a third aspect of the invention, a system for a movable roof element for a motor vehicle comprises an arrangement according to an embodiment as disclosed above. The system comprises the rail. The rail comprises a guide channel. The carriage is guidable in the guide channel. The carriage has a predetermined cross section. The cross section is predetermined such that the carriage is guidable in the guide channel irrespective of the type of coupling. The rail comprises the same cross section, irrespective of whether the coupling is formed according to the first aspect or according to the second aspect or a combination or development thereof. The system is, therefore, able to be configured in a modular manner in the same constructional space according to the first aspect or the second aspect or the combination thereof. In particular, the requirement for constructional space is the same as in conventional systems.

BRIEF DESCRIPTIONS OF THE DRAWINGS

Further advantages, features and embodiments are disclosed from the following examples described in connection with the figures, in which:

FIG. 1 shows a schematic view of an embodiment of a vehicle,

FIG. 2 shows a schematic view of an embodiment of an arrangement,

FIG. 3 shows a schematic view of a cross section of an embodiment of a system,

FIG. 4 shows a schematic view of an embodiment of an arrangement,

FIG. 5 shows a schematic view of an embodiment of an arrangement,

FIG. 6 shows a schematic view of an embodiment of an arrangement and

FIG. 7 shows a schematic view of an embodiment of an arrangement.

DETAILED DESCRIPTION

In the exemplary embodiments and figures, elements which are the same, similar or have the same function may be provided in each case with the same reference numerals.

FIG. 1 shows a detail of a motor vehicle 100. The motor vehicle 100 comprises a vehicle roof 120. A front windshield 122 is arranged in the normal operating position at the front. A rear windshield 123 is arranged in the X-direction to the rear. The vehicle roof 120 extends, in particular, between the front windshield 122 and the rear windshield 123. The vehicle roof 120 comprises a roof opening 121. The roof opening 121 is closable by a roof element 101. By a movement of the roof element 101 relative to the remaining vehicle roof 120, the roof opening 121 is able to be at least partially opened. The roof element 101 is, for example, part of a panoramic sunroof, a spoiler roof, a sliding roof, for example an externally guided sliding roof, and/or a sliding-lifting roof, a roof which is able to be mounted from the top (top-load) or a roof which is able to be mounted from the bottom (bottom-load). The roof element 101 is also called a cover and is made, for example, from glass or a transparent plastics material.

The roof element 101 is provided with a raising mechanism (not explicitly shown). The raising mechanism is in turn coupled to a carriage 103 (FIGS. 2 to 6). The carriage 103 is part of a system 300. The system 300 comprises a rail 104 which is coupled to the vehicle roof 120. Additionally, a drive cable 107 which is at least partially guided in the guide rail 104 and is connected to the carriage 103 is provided. The drive cable and the carriage 103 are both encapsulated by injection-molding. In the Y-direction of FIG. 1, on both sides of the roof element 101 the system 300 comprises the guide rail 104, the drive cable 107 and the carriage 103. These components are configured on both sides, in each case corresponding to one another, so that hereinafter only one side of the system 300 is described. The descriptions apply equally to the other side of the system 300.

A motor 102 is provided, in particular an electric motor, in order to move the drive cable 107 relative to the guide rail 103. The electric motor 102 may also be arranged [on] the side of the roof opening 121 facing the front windshield 122, as shown in FIG. 1. The motor 102 is arranged at a different position, according to further exemplary embodiments, for example on a side of the roof opening 121 facing the rear windshield 123.

FIG. 2 shows an arrangement 200 which comprises the carriage 103 and the drive cable 107. The drive cable 107 is connected to the carriage 103 by means of a coupling. In particular, the drive cable 107 is injection-molded on the carriage so that the drive cable 107 and the carriage 103 are configured integrally.

The drive cable 107 is configured to transmit both pulling and pushing forces to the carriage 103. In particular, the drive cable 107 is designed to be rigid in compression. According to further embodiments, two or more drive cables are provided. The drive cable 107 comprises a helical outer face in order to transmit a drive force of a gearwheel of the motor 120 to the carriage 103.

FIG. 3 shows an embodiment of the system 300. The carriage 103 is guided in a guide channel 116 of the rail 104.

The carriage 103 comprises a first component 105. The first component 105 is formed from a metal, for example from steel. The carriage 103 comprises a second component 106. The second component 106 is formed from a plastics material and, for example, is applied to the first component 105 by means of a method of encapsulation by injection-molding. The drive cable 107 is also injection-molded to the first component 105 by means of the second component 106. The second component 106 thus connects the drive cable 107 to the carriage 103, in particular to the first component 105 of the carriage 103.

A coupling 108 is configured in order to couple the drive cable 107 by means of the carriage 103 to the roof element 101. The coupling 108 is configured to be sufficiently stable in order to remain stable even in the case of forces which in the event of an accident, in particular a front impact, accelerate the roof element in the negative X-direction in the direction of the front windshield 122. The coupling 108 is configured such that a separation is prevented between the drive cable 107 and the carriage 103. In particular, a detachment of the second component 106 from the first component 105 is prevented in the region of the coupling 108 between the drive cable 107 and the first component 105.

FIG. 4 shows the arrangement 200 with the coupling 108 according to a first aspect. The coupling 108 comprises a roughening 109 of the first component 105. The roughening 109 is incorporated on at least one side 117 of the first component 105 facing the drive cable 107. For example, the first component 105 is roughened by the action of a laser beam. Moreover, other methods for roughening the surface of the first component 105 are possible, for example a mechanical treatment for forming the roughening 109.

By means of the roughening 109 of the surface of the steel of the first component 105, a non-positive connection of the second component 106 to the first component 105 is made at least in the region of the roughening 109. Due to the roughening 109 on the surface of the first component 105 a microstructure is formed, wherein it is possible that the second component 106 forms undercuts with the microstructure. Thus a connection of the first component 105 to the second component 106 is possible in the region of the roughening 109 in the manner of an adhesive bond. The roughening 109 permits a non-positive and/or positive connection of the first component 105 to the second component 106 which is able to transmit greater forces between the first component 105 and the drive cable 107 than might be the case if the second component 106 were to bear only against a relatively smooth surface of the first component 105. A detachment of the second component 106 from the first component 105 is thus prevented. Thus the coupling 108 of the drive cable 107 to the carriage 103 is configured to be sufficiently stable in order to be retained in a reliable manner even in the event of an accident. Thus it is possible to use the drive cable 107 as a brake for the carriage 103 and thus for the roof element 101.

FIG. 5 shows the arrangement 200 according to a further embodiment. The coupling 108 comprises a recess 110. The recess 110 is formed in a region 118 of the first component 105 facing the drive cable 107. The recess 110 is configured in the manner of a slot and extends over a part of the first component 105 in the X-direction. The recess 110 is configured such that it penetrates the region 118 in the Y-direction.

Plastics material of the second component 106 is arranged in the recess 110. Additionally, a retaining head 111 is configured on one side 112 of the first component 105 remote from the drive cable 107. The retaining head 111 is formed from the plastics material of the second component 106.

The retaining head is arranged in a region 113 on the recess 110. The plastics material of the second component 106 extends from the drive cable 107 through the recess 110 and forms the retaining head 11 on the side 112. The retaining head 111 has, in particular, a larger cross section than the recess 110. Thus, by means of the retaining head 111 and the material, a type of plastics rivet is formed in the recess 110, said plastics rivet reliably fastening the drive cable 107 to the carriage 103 and/or the first component 105.

By means of the recess 110 in the first component 105, it is possible to produce a through-injection-molding which is provided on the side 112 remote from the cable 107 with the retaining head 111 made of a plastics accumulation, in the manner of a welding dome. By means of the plastics material in the recess 110 and on the drive cable 107, the retaining head 111 reliably retains the second component 106 on the first component 105 such that, in the event of an accident, sufficient forces are able to be transmitted to the drive cable 107, in particular sufficient for an EU NCAP. Thus the coupling 108 of the drive cable 107 to the carriage 103 is configured to be sufficiently stable in order to be retained reliably in the event of an accident. Thus it is possible to use the drive cable 107 as a brake for the carriage 103 and thus for the roof element 101.

FIG. 6 shows the arrangement 200 according to a further embodiment. The embodiment of FIG. 6 substantially corresponds to the embodiment as described in connection with FIG. 5. Additionally, a retaining element 114 is provided.

The retaining element 114 is, for example, a sheet metal element which is connected to the drive cable 107 so that the drive cable 107 and the retaining element 114 are immovable relative to one another. For example, the retaining element 114 is crimped onto the drive cable 107. The retaining element 114 extends from the drive cable 107 through the recess 110 into the retaining head 111. The retaining element 114 comprises a projecting region 115. The projecting region 115 projects on the side 112 over the first component 105. Thus an undercut and/or a hooking of the retaining element 114 behind the first component 105 is possible.

For producing the arrangement 200, the retaining element 114 is inserted into the recess 110, so that on the side 112 it forms the projecting region 115. Subsequently, the drive cable 107, the retaining element 114 and the first component 105 are encapsulated by injection-molding, so that the second component 106 is formed. The retaining element 114 is positively connected to the first component 105, for example in the manner of a bayonet closure. The retaining element 114 is clamped with the first component 105, so that a reliable connection is made between the drive cable 107 and the first component 105 by means of the retaining element 114.

The retaining element 114 comprises an extension in the X-direction. Thus the retaining element 114 contributes to the prevention of a rotation and/or deflection about the Y-axis of the carriage 103, which is articulated to the front on only one side, occurring in the event of an accident. The rotation and/or the deflection of the carriage 103 may lead to a detachment of the second component 106 from the first component 105 and thus to a detachment of the drive cable 107 from the carriage 103. As the rotation and/or the deflection is reduced, the risk of a detachment of the second component 106 from the first component 105 is reduced. Thus the attachment of the drive cable 107 to the carriage 103, in particular to the first component 105, is configured to be reliable. In particular, it is possible to transmit forces by means of the coupling 108 to the retaining element 114, which is required by a US NCAP. Thus the coupling 108 of the drive cable 107 to the carriage 103 is configured to be sufficiently stable in order to be retained in a reliable manner, even in the event of an accident. Thus it is possible to use the drive cable 107 as a brake for the carriage 103 and, therefore, for the roof element 101.

FIG. 7 shows the arrangement 200 according to a further embodiment. The embodiment of FIG. 7 substantially corresponds to the embodiment as described in connection with FIG. 6.

In contrast to the embodiment of FIG. 6, the retaining element 114 is angled back in the projecting region 115. In the projecting region the retaining element 114 is angled-back relative to a main direction of extension, for example bent-back. The main direction of extension extends between the drive cable 107 and the recess 110. In the exemplary embodiment shown, the two ends of the sheet metal element which forms the retaining element 114 in each case are at an angle relative to the main direction of extension. According to further embodiments, only one end is angled back. According to embodiments, the retaining element 114 in the projecting region 115 is fully angled in the X-direction. According to further embodiments, the retaining element 114 in the projecting region 115 is only partially angled in the x-direction.

By the bent-back ends in the projecting region 115, the retaining element 114 is reliably clamped to the first component 105, so that a reliable connection is made between the drive cable 107 and the first component 105 by means of the retaining element 114. By the bent-back end in the projecting region 115, the retaining element 114 is reliably retained by the second component 106. A decoupling of the retaining element 114 from the carriage 103 and/or the first component 105 is thus prevented. The coupling 108 of the drive cable 107 to the carriage 103 is configured to be sufficiently stable in order to be retained in a reliable manner, even in the event of an accident.

According to further exemplary embodiments, a combination is provided of the exemplary embodiment as described in connection with FIG. 4 with the exemplary embodiments as described in connection with FIGS. 5 to 7. Thus, for example, both the roughening 109 and the recess 110 with the retaining head 111 are provided in the coupling 108. According to further exemplary embodiments, the coupling 108 comprises both the roughening 109 and the recess 110 and the retaining element 114 and the retaining head 111.

The arrangement 200 is configured irrespective of the design of the coupling 108 such that it may be guided in the guide rail 104 with the guide channel 116. The cross section of the guide rail 104 and/or the guide channel 116 is always the same, irrespective of whether an arrangement 200 according to FIG. 4, according to FIG. 5, according to FIG. 6 or according to FIG. 7 is used. Thus the system is of modular configuration. Couplings 108 of different strengths are able to be formed in the same constructional space, for example, depending on the customer requirements. For example, it is possible to provide a scaled system 300, using the same constructional space but at different costs depending on customer requirements. Additionally, compared to conventional systems an increase in constructional space is not required.

The invention claimed is:

1. The arrangement for a movable roof element for a motor vehicle, comprising:
    a carriage which is designed to be guided in a rail and to be moved relative to the rail and which has a first component and a second component, and
    a drive cable,
    wherein the second component at least partially surrounds the first component and the drive cable in order to form a coupling between the drive cable and the carriage,
    wherein the coupling has
    a recess of the first component,
    a material of the second component being arranged therein,
    a retaining head which is configured by means of the second component on a side remote from the drive cable in a region of the recess, and
    wherein the second component is formed from a plastics material and the coupling is formed by encapsulating the drive cable and the first component by encapsulating with the plastics material.

2. The arrangement according to claim 1, wherein the coupling further comprises: a roughening of the first component in order to form a bonded connection between the first and the second component.

3. The arrangement according to claim 1, wherein the coupling further comprises: a retaining element which is connected to the drive cable and which, starting from the drive cable, extends through the recess.

4. The arrangement according to claim 3, wherein the retaining element comprises a projecting region which projects over the first component on the side remote from the drive cable.

5. The arrangement according to claim 4, wherein the projecting region projects into the retaining head.

6. The arrangement according to claim 4, wherein the retaining element is configured to be angled back in the projecting region.

7. The arrangement according to claim 3, wherein the retaining element is connected to the drive cable by means of a plastic deformation.

8. The arrangement according to claim 3, wherein the retaining element is formed from a metal.

* * * * *